No. 724,071. PATENTED MAR. 31, 1903.
T. E. ADAMS.
ELECTRIC ARC LAMP.
APPLICATION FILED JAN. 18, 1902.
NO MODEL. 5 SHEETS—SHEET 2.

No. 724,071. PATENTED MAR. 31, 1903.
T. E. ADAMS.
ELECTRIC ARC LAMP.
APPLICATION FILED JAN. 18, 1902.
NO MODEL. 5 SHEETS—SHEET 3.
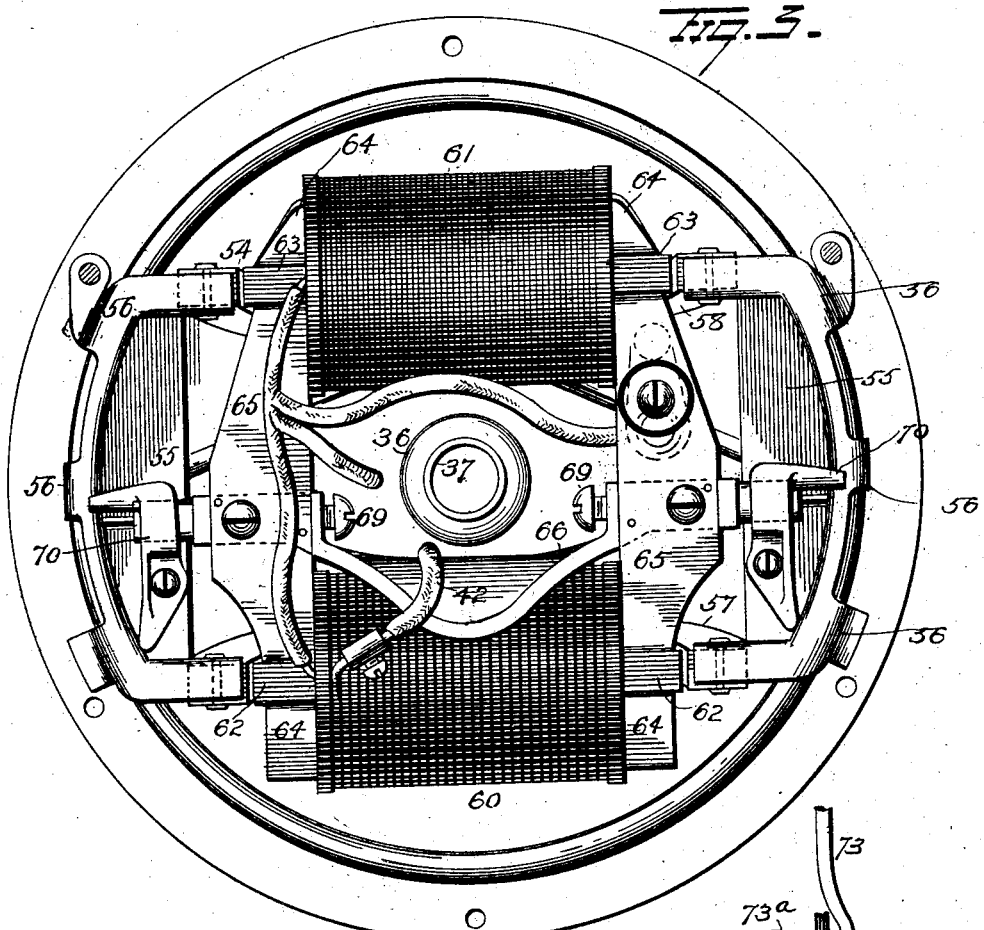
Fig. 3.
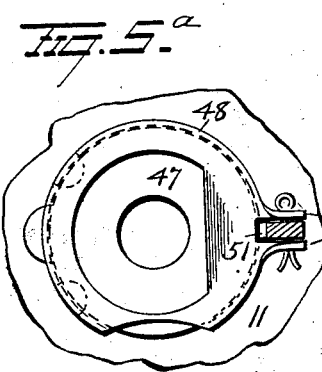
Fig. 5ª.
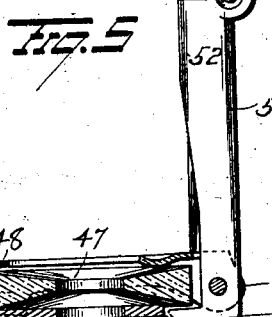
Fig. 5.
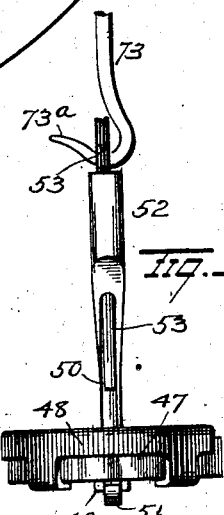
Fig. 5ᵇ.
WITNESSES
E. J. Nottingham
G. F. Downing
INVENTOR
T. E. Adams
By H. A. Seymour
Attorney

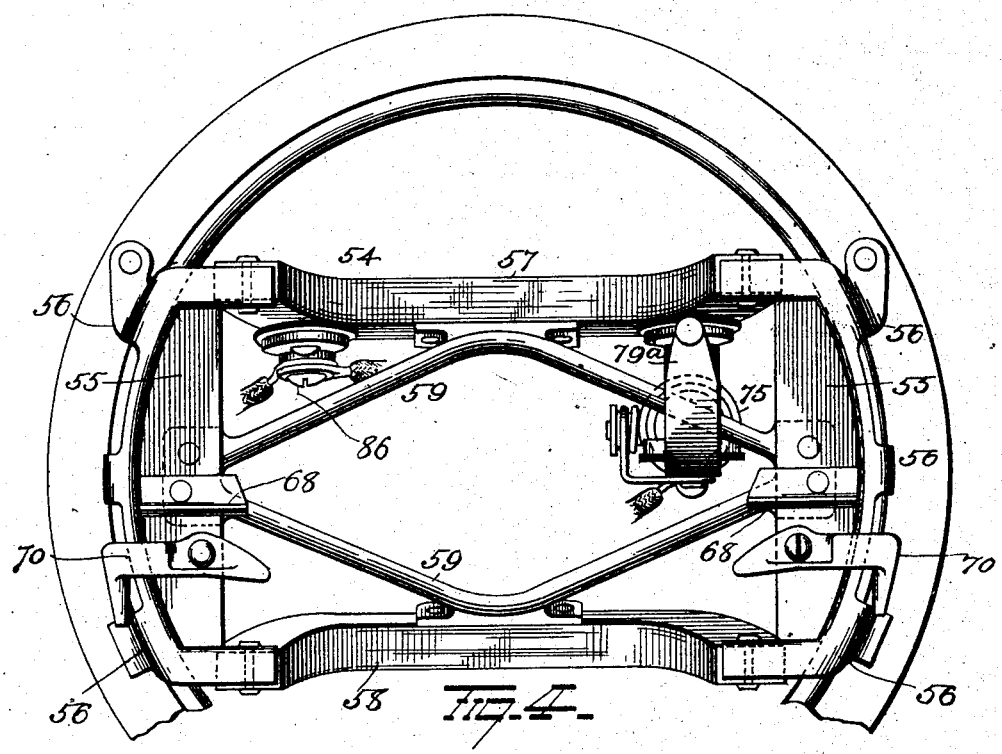
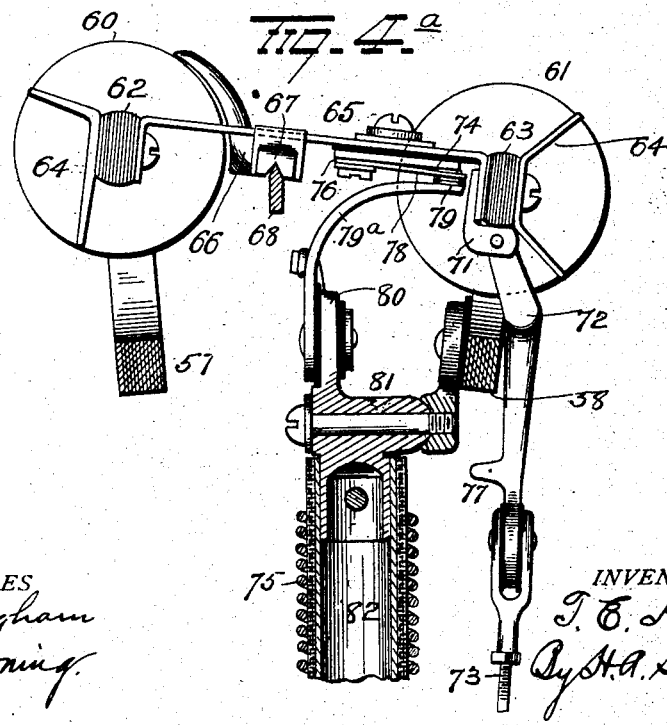

No. 724,071. PATENTED MAR. 31, 1903.
T. E. ADAMS.
ELECTRIC ARC LAMP.
APPLICATION FILED JAN. 18, 1902.
NO MODEL. 5 SHEETS—SHEET 5.
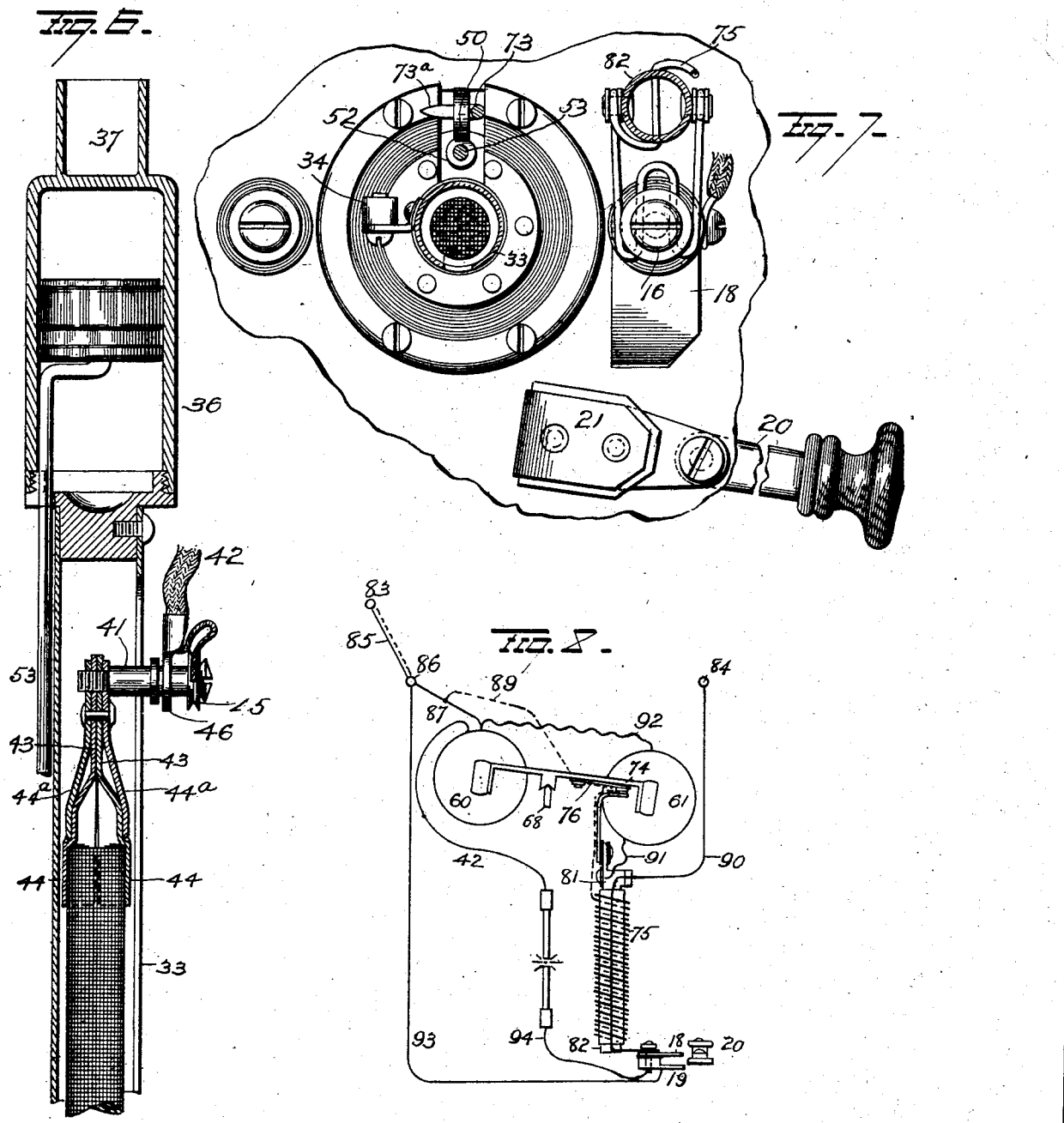

UNITED STATES PATENT OFFICE.

THOMAS EDGAR ADAMS, OF CLEVELAND, OHIO.

ELECTRIC-ARC LAMP.

SPECIFICATION forming part of Letters Patent No. 724,071, dated March 31, 1903.

Application filed January 18, 1902. Serial No. 90,326. (No model.)

*To all whom it may concern:*

Be it known that I, THOMAS EDGAR ADAMS, of Cleveland, in the county of Cuyahoga and State of Ohio, have invented certain new and useful Improvements in Electric-Arc Lamps; and I do hereby declare the following to be a full, clear, and exact description of the invention, such as will enable others skilled in the art to which it appertains to make and use the same.

My invention relates to an improvement in electric-arc lamps, and more particularly to the "differential" type, adapted for use on alternating-current circuits, one object of the invention being to improve the sensitiveness and accuracy of the controlling and feeding devices.

A further object is to so construct and arrange the controlling mechanism as to reduce the alternating effect of vibration to a minimum.

A further object is to so mount the controlling mechanism in the casing as to render it readily accessible and to facilitate the assembling of the same.

A further object is to provide a ring clutch which shall be durable, non-arcing, and heat-resisting.

A further object is to provide a cover for the arc-inclosing globe which will effectually resist heat, which will not rust, which will be moisture-proof, and which shall possess high insulating properties.

A further object is to improve and simplify the lamp as a whole and insure in a high degree the efficiency of the same.

With these objects in view the invention consists in certain novel features hereinafter described, and pointed out in the claims.

Figure 1:
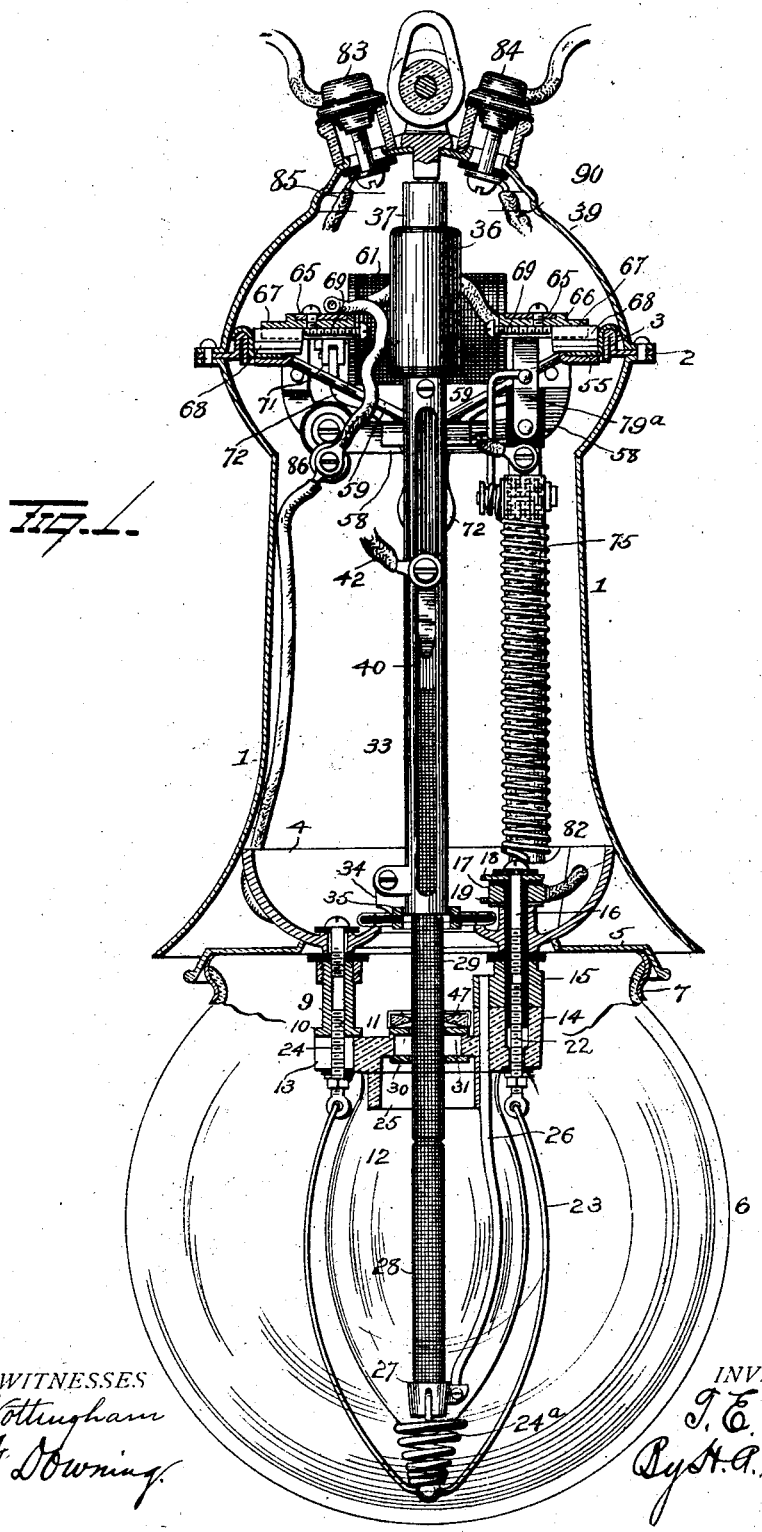
Figure 2:
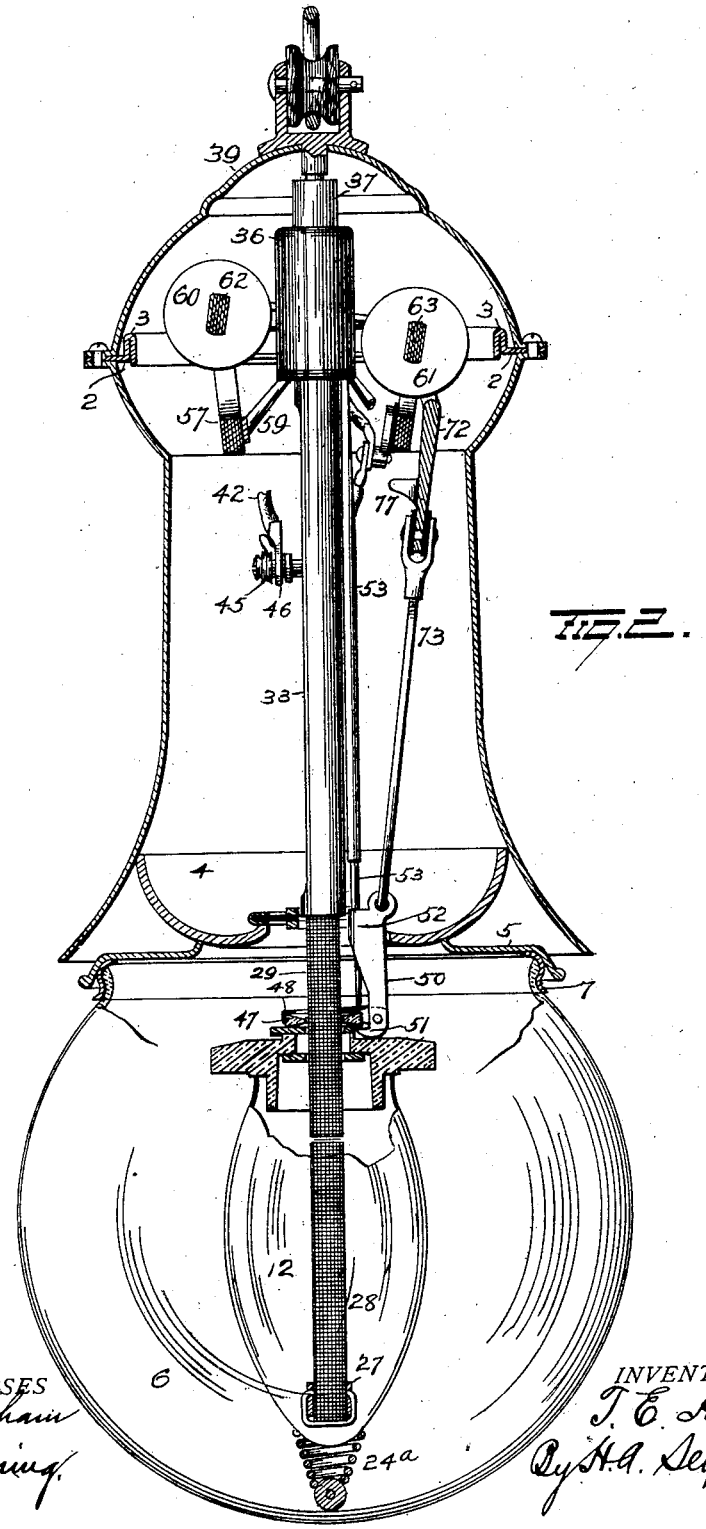

In the accompanying drawings, Figure 1 is a vertical sectional view of an electric-arc lamp embodying my invention. Fig. 2 is a vertical sectional view at right angles to Fig. 1. Fig. 3 is a plan view with the cap removed. Figs. 4, 4ª are detail views of the frame which supports the regulator-magnets and attached parts. Figs. 5, 5ª, 5ᵇ are detail views of the clutch. Fig. 6 is a detail view of the upper-carbon holder. Fig. 7 is a detail view showing devices in the lower part of the casing. Fig. 8 is a diagram of the circuits.

1 represents the lamp-casing, made, preferably, of sheet metal and provided at its upper end with a ring 2, having a flange 3 on its top. The lower portion of the sheet-metal casing is made flaring and has secured therein a basin 4, preferably of cast metal, which constitutes the floor of the lamp. The basin or lamp-floor is provided on its bottom with lugs, to which a reflector 5 is secured, said reflector also constituting a cover for the outer globe 6. A holder 7 is provided for the outer globe and holds the upper end of the latter against or in close proximity to the under face of the reflector and is removably attached to the lamp-casing by means of suitable fastening devices and is also connected with said casing by means of a chain, by which the globe when detached may be suspended to facilitate the trimming of the lamp. The lamp-floor and reflector are provided with central openings to permit the passage of the upper carbon and portions of the clutch-operating devices. To one side of said central opening an arm 9 depends from the basin or floor 4 and is provided at its free end with a flange or head 10. A porcelain cover 11 for the inner globe 12 is disposed a short distance below the lamp-floor and provided at one side with a slot 13 to receive a screw entering the depending arm 9, the head on said arm serving as a bearing for the cover. At a point on the cover 11 diametrically opposite to the slot 13 said cover is provided with an enlargement 14, on which a metal block 15 is seated, and this block is secured to the lamp-floor by means of a screw 16. This screw passes downwardly through a block 17, located in the lamp, and enters the block 15 on the cover 11. The block 17 serves to separate the leaves 18 19 of a cut-out switch, but it is electrically insulated from the upper leaf 18 of said switch and is in electrical contact with the other leaf 19, the latter being insulated from the lamp-floor. The lever 20 of this switch is pivoted to the lamp-floor and provided with an insulated metallic strip 21 to enter between and electrically connect them for the purpose of cutting out the lamp, as will be hereinafter more fully explained.

A screw 22 passes upwardly through the porcelain cover 11 and enters the metal block 15, thus securing the latter to the cover. The screw 22 is provided at its lower end with an eye for the reception of one arm of the inner globe-supporting yoke 23, the other arm of said yoke being attached to a similar screw 24, which enters and depends from the depending arm 9 and having a nut to retain the cover in place. The yoke 23 is provided at its lower end with a conical coiled spring 24ª, which receives the lower end of the inner globe 12 and presses its upper end against the under face of the porcelain cover 11, which latter is provided with a depending flange 25, that enters the open upper end of the globe. By employing a cover made of porcelain the upper end of the inner glass globe can be so ground as to effect a perfect joint with the cover and remain durable. Furthermore, a porcelain cover will resist heat, it will not rust, is moisture-proof, and its high insulating properties render it a great improvement upon metal and carbon covers.

An arm 26 is secured at its upper end to the metal block 15 and passes downwardly through the porcelain cover 11, terminating at its lower end in proximity to the bottom of the inner globe 12, where it is provided with a clamp 27 for the lower carbon 28. The upper carbon 29 passes through the central opening in the lamp-floor and through a hole in the porcelain cover 11, said hole being appreciably larger than the diameter of the carbon. Metal plates 30 31 are disposed against the upper and lower faces of the cover 11 and secured in place by screws 32, said plates having alining holes of a size to permit the free passage of the upper carbon through them. A tube 33 is located within the casing 1 for the reception of the upper carbon and is secured at its lower end to a lug 34, which projects upwardly from a ring 35, mounted on a perforated insulating-disk secured to the lamp-floor.

The upper end of the carbon-tube 33 has secured thereto an air-pot 36, and the latter is provided on its top with a cylindrical extension 37, which receives a plunger depending from the cap 39 of the lamp-casing, and thus the upper end of the carbon-tube is held properly in place. A carbon-holder 40 is disposed within the carbon-tube 33, and said tube is slotted for the accommodation of a binding-post 41, by means of which a connecting wire or cable 42 is connected with the carbon-holder. In constructing the carbon-holder 40 I employ two plates 43, placed face to face and provided with coöperating jaws 44 to receive the upper end of the carbon rod. The jaws are pressed toward each other by means of spring-arms 44ª, secured to the plates 43 by the same rivet which secures said plates together. The binding-post 41 is screwed through the upper ends of the plates 43 and spring-arms 44ª and is provided with small disks 45, between which the naked end of the cable 42 is secured, said cable being also preferably provided with a disk 46, mounted on the binding-post.

Between the lamp-floor 4 and the porcelain globe-cover 11 the clutch 47 for the upper carbon is located. This clutch is operated in a manner hereinafter described, and it comprises a ring or perforated disk of porcelain mounted loosely in a light sheet-metal frame 48, provided with lugs 49, to which a lifter 50 is pivoted and provided at a point below its pivot with a tooth or hook 51 to engage the under face of the porcelain clutch ring or disk. The lifter is made with a tubular portion 52, through which a rod 53 is guided, the lower end of said rod bearing upon the metal frame of the clutch at a point as near the carbon as possible and acts to hold down and prevent the vibration of the side of clutch farthest from point of lift. The upper end of the rod 53 enters the air-pot 36, wherein it is provided with a plunger having a valve so arranged that when the lifter 50 is raised to operate the clutch and separate the carbons said valve will close, and thus cause the upward movement of the plunger of the air-pot to somewhat pack the air above it before the clutch separates the carbons, and thus effect the gradual separation of the carbons. When the lifter is permitted to descend during the automatic regulation of the lamp, the valve in the air-pot plunger will open and permit the free descent of said lifter, clutch, and carbon rod.

Experience has shown that a ring clutch made of porcelain is a vast improvement upon metal clutches, because it is more durable, is non-arcing, and it resists heat.

A frame 54 is mounted on the ring 3 at the upper end of the lamp-casing, and comprises end plates 55, having lips 56 to engage the flange 3 of said ring, and U-shaped yokes 57 58, connecting said end plates at each end of the latter. If desired, one of the lips of each end plate may be extended and perforated for the passage of one of the screws which secure the cap 39 in place on the casing.

A double brace 59 is secured between its ends to the center of the yokes 57 58, and at its ends said braces are secured to the end plates 55.

The yokes 57 58 each consist of a series of iron plates secured together, and thus constitute laminated armatures for electromagnets 60 61, each having a laminated core projecting beyond the ends of the coils to form pole-pieces 62 63, disposed between the parallel arms of the respective yoke-armatures. The spools of the magnets are retained properly in place and prevented from longitudinal displacement by means of angle-pieces 64, (preferably of non-magnetic material,) secured to the pole-pieces and bearing against the ends of the spools.

The magnet 60 is wound with coarse wire and the magnet 61 is wound with fine wire and connected up in the lamp-circuit, as explained farther on. The magnets are disposed horizontally parallel with each other and spaced apart by spring-metal plates 65, the ends of which are secured to the pole-pieces of the magnets. A bar 66 is secured at its ends to the under faces of the respective spring-plates 65, and the intermediate portion of this bar is bent laterally toward the coarse-wire magnet 57. At each end the under face of the bar 66 is made with V-shaped grooves 67 for the reception of knife-edge plates 68, secured upon the end plates 55 of the frame 54, and thus the magnets are pivotally supported upon the frame 54 through the medium of the flexible plates 65. In order to prevent longitudinal displacement of the trunnion-bar 66 and the magnets, screws 69 are inserted in said bar and engage the ends of the knife-edge plates 68. The bar 66 is held properly in place on the knife-edges, and the parts carried by said bar are retained in place by means of thumb-pieces 70, pivoted to the frame 54 and adapted to overlap the ends of the trunnion-bar 66. The magnets are so mounted that the weight of the fine-wire spool 58 will normally overbalance the weight of the coarse-wire coil.

Blocks 71 are secured to the pole-pieces of the fine-wire magnet, and to these blocks a yoke 72 is pivotally connected. A rod 73 is secured to (and preferably insulated from) the yoke 72, and the lower end of said rod is provided with a hook 73ª, which engages the clutch-lifter 50, so that in starting the lamp when the coarse-wire magnet is energized said magnet will descend, and thus cause the elevation of the fine-wire magnet and the yoke and rod attached thereto, thereby effecting a lifting of the clutch and upper carbon of the lamp. The yoke 72 may be provided with a lug 77 to engage one of the armature-yokes to limit the upward movement of said yoke 72 and the parts to which it is connected. The overbalancing of the coarse-wire magnet by the fine-wire magnet normally effects the closing of a switch 74, which forms a part of a cut-out circuit including a resistance 75. In constructing this switch a block 76 is secured to but insulated from one of the flexible supporting-plates 65, and to this block a spring contact-strip 78 is secured, the free end of said strip carrying a contact-point to normally engage a contact-point 79 at the free end of an L-shaped arm 79ª. The lower end of the arm 79ª is secured to (but insulated from) a lug 80 on a block 81, and said block is attached to (but insulated from) one of the armature-yokes. The block 81 is secured to the upper end of a tube 82, the lower end of which terminates in proximity to the cut-out switch. The resistance-wire 75 is coiled about the tube 82, but is insulated therefrom, except the lower end of said coil, which is electrically connected with said tube and also electrically connected with the screw 16, which passes through the cut-out switch and electrically connects the latter with the arm 26, by which the lower carbon is supported. The upper end of the resistance-wire 75 is electrically connected with the arm 79ª.

The cap 39 is provided with binding-posts 83 84 for the attachment of the line-wires. The positive binding-post 83 is connected by means of a conductor 85 with a binding-post 86, secured to but insulated from one of the armature-yokes. A conductor 87 connects the binding-post 86 with one of the coarse-wire coils 60, and the other end of the latter is connected by a flexible cable 42 with the binding-post 41 of the upper-carbon holder.

A conductor 89 is electrically connected at one end to the conductor 87, and at the other end said conductor 89 is electrically connected with the block 76 of switch 74. The block 81 at the upper end of tube 82 is connected by a conductor 90 with the negative terminal 84 of the lamp. The block 81 is also connected by a wire 91 with one end of the fine-wire coil 61, and the other end of said coil is connected by a wire 92 with the conductor 87. As the wire 87 is connected with the positive terminal of the lamp and the block 81 with the negative terminal, the fine-wire coil will be disposed in a shunt-circuit.

The upper leaf of the cut-out switch is connected through the tube 82 with the negative terminal of the lamp, and the insulated lower leaf of said switch is electrically connected by a conductor 93 with the binding-post 86, which, as before explained, is connected with the positive terminal of the lamp. Thus it will be seen that when the cut-out is closed the carbons and regulating mechanism of the lamp are cut out. In starting the lamp this switch will be opened, and the first path of the current can be traced through conductors 85 87 89 to switch 74, which latter, as before explained, is maintained normally closed by the preponderance of weight of the fine-wire magnet over the weight of the coarse-wire magnet. From the switch 74 the circuit can be traced through the resistance-wire 75 to the lower end of the tube 82, on which said wire is wound, then through said tube to the block 81, at the upper end thereof, and then by the conductor 90 to the negative terminal of the lamp. The effect of the resistance 75 will be to cause a portion of the current to be passed through the coarse-wire magnet and energize it, whereupon as the magnet 60 descends the pivoted frame or plates by which the magnets are carried will be tilted, thus raising the fine-wire magnet 61 and opening the switch 74. The coarse-wire magnet and the carbons will now be in series in the main lamp-circuit, and the further tilting or descent of the coarse-wire magnet and the consequent raising of the fine-wire magnet with which the clutch-operating rod is connected will effect the separation of the carbons and the starting of the lamp in a manner which will be readily understood without further explanation. As the arc lengthens and the consequent resistance increases current will be shunted through the fine-wire magnet, with the result of causing the coarse-wire magnet to ascend and the fine-wire magnet to descend and the consequent manipulation of the clutch to effect the feeding of the upper carbon. When the normal arc shall have been again established, the normal working positions of the parts will be restored, with the coarse-wire magnet predominating, both mechanically and electrically, over the fine-wire magnet.

Because the magnetic path in electromagnets is better than in solenoids less turns of wire are necessary. The action is smarter, with less current wasted in the shunt-spool. The spools attached at opposite ends of an elastic seesaw, that is carried by knife-edges with minimum friction and between their poles in magnetic balance, respond to slight current changes. The inertia of the spools and the elasticity of their support prevent vibration and noise. A convenient way of causing the weight of the shunt-spool to predominate over the weight of the series spool is to arrange the knife-edge fulcrums of the seesaw-frame nearer the series than the shunt-spool, and the series spool acts against the preponderance of weight of the shunt-spool and attached parts. Adjustment of arc length may be made by altering the degree of preponderance of weight of the shunt-spool over the weight of the series spool, or the same result might be accomplished by varying the number of turns on the series coil.

Various slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. In an electric-arc lamp, the combination with a horizontally-disposed frame pivotally supported between its ends, of a coarse-wire electromagnet fixed to one end of said frame, a fine-wire electromagnet secured to the other end of said frame, stationary armatures coöperating with the poles of said magnets and clutch-operating devices connected with said frame.

2. An electric-arc lamp, provided with differential controlling mechanism, comprising a frame disposed horizontally and pivotally supported between its ends, electromagnets secured to the respective ends of said frame, one of said magnets wound with coarse wire and the other wound with fine wire and stationary armatures coöperating with the poles of said magnets.

3. Differential controlling mechanism for an arc-lamp, comprising a horizontally-disposed spring-frame pivotally supported between its ends, coarse and fine wire electromagnets secured to the respective ends of said spring-frame and stationary armatures coöperating with the poles of said electromagnets.

4. Differential controlling mechanism for arc-lamps, comprising a horizontally-disposed frame pivotally supported between its ends, coarse and fine wire electromagnets secured to the respective ends of said frame, said magnets having stationary cores and pole-pieces projecting beyond both ends of their spools, and fixed armatures coöperating with the two pairs of pole-pieces of the magnets.

5. In an electric-arc lamp, the combination of two magnets, fixed armatures therefor, elastic devices connecting said magnets, means for pivotally supporting said elastic devices, and clutch-operating devices connected with one of said magnets.

6. In an electric-arc lamp, the combination of series and shunt electromagnets having fixed pole-pieces, fixed armatures therefor, mechanical devices connecting said magnets, means for pivotally supporting said mechanical devices between the magnets, said parts constructed and arranged so that the shunt-magnet will mechanically overbalance the series magnet and clutch-operating devices connected with the shunt-magnet.

7. In an electric-arc lamp, the combination with two pivotally-supported electromagnets, wound with coarse and fine wire respectively, the fine-wire magnet mechanically overbalancing the coarse-wire magnet, and clutch-operating means connected with one of said magnets.

8. In an electric-arc lamp, the combination with an elastic support, magnets secured to the ends of said elastic support and fixed armatures for the magnets, of means for pivotally mounting said elastic support between the magnets, and clutch-operating devices connected with one of said magnets.

9. In an electric-arc lamp, the combination with two horizontally-disposed electromagnets having fixed pole-pieces and a pivotal support between said magnets, of a fixed armature for each magnet, and clutch-operating devices connected with one of said magnets.

10. In an electric-arc lamp, the combination of a mechanical horizontally-disposed seesaw carrying an electromagnet at each end, each magnet having fixed pole-pieces, fixed armatures for the magnets, and clutch-operating devices connected with one end of said seesaw.

11. In an electric-arc lamp, the combination of an elastic seesaw carrying electromagnets at its respective ends, fixed armatures for the magnets and clutch-operating devices attached to one end of said seesaw.

12. In an electric-arc lamp, the combination of two elastic plates, of magnets disposed between said plates and having their poles secured thereto, means for pivotally supporting said plates between the ends thereof, and clutch-operating devices connected with one of said magnets.

13. In an electric-arc lamp, the combination with the lamp-casing, of a horizontal frame mounted upon the top of said casing, two electromagnets, mechanical devices connecting said magnets, means on said horizontal frame for pivotally supporting said mechanical connecting devices and clutch-operating devices connected with one of said magnets.

14. In an electric-arc lamp, the combination with the lamp-casing, of a frame mounted upon the top of said casing, knife-edges on said frame, two magnets, devices connecting said magnets and having bearings upon said knife-edges, fixed armatures for said magnets, and clutch-operating devices connected with one of said magnets.

15. In an electric-arc lamp, the combination with two magnets, each having fixed pole-pieces projecting beyond both ends, horizontally-disposed devices connecting said magnets and means for pivotally supporting said horizontally-disposed connecting devices, of fixed armatures having their two ends disposed in proximity to the pole-pieces of the respective magnets.

16. In an electric-arc lamp, the combination with a frame comprising end plates and two iron yokes connecting the end plates and constituting armatures, electromagnets having fixed poles disposed between the ends of said iron yokes, horizontally-disposed devices connecting said magnets, means for pivotally supporting said connecting devices, and clutch-operating devices connected with one of said magnets.

17. In an electric-arc lamp, the combination with two magnets having protruding pole-pieces, of elastic plates secured at their ends to pole-pieces of the magnets, means for pivotally supporting said elastic plates and clutch-operating devices connected with one of said magnets.

18. In an electric-arc lamp, the combination with two magnets, plates secured at their ends to said magnets, a bar secured to said plates between their ends, knife-edge bearings for said bar, and clutch-operating devices connected with one of said magnets.

19. In an electric-arc lamp, the combination of two magnets, plates connecting said magnets, a bar secured to said plates, said bar having grooves in its under face, knife-edge bearings on which the grooved bar is mounted, screws in said bar to bear against the ends of the knife-edge bearings, and clutch-operating devices connected with one of said magnets.

20. In an electric-arc lamp, the combination with the lamp-casing, of a frame mounted thereon and carrying armatures, two magnets, plates connecting said magnets, knife-edges on the frame, trunnions secured to said plate and bearing on said knife-edges, and pivoted thumb-pieces on the frame adapted to overhang the trunnions.

21. In an electric-arc lamp, the combination with a horizontally-disposed frame pivotally supported between its ends, of an electromagnet secured to an end of said frame, said electromagnet having a fixed core, means for overbalancing the end of the frame to which magnet is secured, clutch-operating devices mechanically connected with the overbalanced end of the frame and a fixed armature exposed to the pole of the fixed core of said electromagnet.

22. In an electric-arc lamp, the combination of a pivotally-supported frame, an electromagnet secured thereto having a fixed core, a stationary armature exposed to said fixed core of the magnet, means for mechanically overbalancing said magnet, a carbon-clutch and connections between the clutch and said overbalancing means.

23. In an electric-arc lamp, the combination of a magnet, an elastic pivotal support for said magnet, means for mechanically overbalancing said magnet, a clutch and means connecting said clutch with said overbalancing means.

24. In an electric-arc lamp, the combination with two magnets, plates connecting said magnets and means for pivotally mounting said plates, of a resistance-coil, a conductor passing through said coil and electrically connected at one end thereto, an arm supported by said tube and electrically connected with the resistance-coil, a contact-piece on one of the pivoted connecting-plates coöperating with said arm to form a switch, means for connecting said tube with one terminal of the lamp and means for connecting said contact-piece with the other terminal of the lamp.

25. In an electric-arc lamp, the combination with two horizontally-disposed electromagnets and a pivotal support between them, of a clutch, a lifter therefor, a yoke pivotally connected with one of said magnets and a rod connecting said yoke with the clutch-lifter.

26. A ring-clutch consisting of a perforated disk of non-metallic material.

27. A clutch for an electric-arc lamp consisting of a ring or perforated disk of porcelain.

28. A clutch for an electric-arc lamp, comprising a porcelain ring and a metal frame for said ring.

29. In an electric-arc lamp, the combination with a porcelain-ring clutch and a metal frame or holder therefor, of a lifter pivoted to said frame and adapted to engage the porcelain clutch-ring.

30. In an electric-arc lamp, the combination with a porcelain-ring clutch, a metal frame or holder therefor, a lifter attached to said frame and adapted to engage the porcelain-ring clutch, an air-pot and a rod connected with a plunger of said air-pot and bearing on said frame.

31. In an electric-arc lamp, the combination with a ring-clutch, a frame or holder in which said clutch is mounted, a lifter pivoted to said frame, and adapted to engage the clutch-ring, an air-pot, and a rod connected with the plunger of the air-pot, passing through and guided by the lifter and bearing at its lower end upon said frame or holder.

32. In an electric-arc lamp, the combination with a frame, and an arc-inclosing globe, of a porcelain cover for the globe, an arm depending from the frame and engaging said porcelain cover, an integral enlargement on said cover opposite to said arm, a metal block on said enlargement, means for securing said block and enlargement to the casing, and a lower-carbon holder connected with said metal block.

33. In an electric-arc lamp, the combination with a frame and an arc-inclosing globe, of a porcelain cover for the globe secured to the casing, said cover having a hole appreciably larger than the upper carbon of the lamp, metal plates having holes for the passage of the upper carbon, said plates placed against the respective faces of the porcelain cover and screws connecting said plates.

In testimony whereof I have signed this specification in the presence of two subscribing witnesses.

THOMAS EDGAR ADAMS.

Witnesses:
JOHN D. ERTEL,
C. J. CRABLE.